United States Patent
Osaki et al.

(10) Patent No.: US 7,985,120 B2
(45) Date of Patent: Jul. 26, 2011

(54) APPARATUS AND METHOD FOR GRINDING WORKPIECE

(75) Inventors: Yoshitaro Osaki, Aichi-ken (JP); Toshihiro Yonezu, Nishio (JP); Makoto Nonoyama, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 518 days.

(21) Appl. No.: 12/163,142

(22) Filed: Jun. 27, 2008

(65) Prior Publication Data

US 2009/0017734 A1    Jan. 15, 2009

(30) Foreign Application Priority Data

Jun. 28, 2007   (JP) ................................. 2007-170470

(51) Int. Cl.
*B24B 49/00*   (2006.01)
*B24B 51/00*   (2006.01)

(52) U.S. Cl. ................ 451/5; 451/10; 451/49; 451/178; 451/242; 451/910

(58) Field of Classification Search .................. 340/680; 451/5, 8, 10, 11, 48, 49, 124, 127, 164, 165, 451/166, 178, 242, 243, 397, 3, 98, 910

See application file for complete search history.

(56) References Cited

U.S. PATENT DOCUMENTS

| | | | |
|---|---|---|---|
| 4,041,647 A | | 8/1977 | Ugo |
| 4,553,355 A | * | 11/1985 | Smith ............................. 451/21 |
| 5,655,956 A | * | 8/1997 | Ferreira et al. ................ 451/143 |
| 5,664,985 A | | 9/1997 | Williams et al. |
| 5,722,878 A | * | 3/1998 | Phillips ........................... 451/49 |
| 5,984,765 A | * | 11/1999 | Hashimoto ................... 451/165 |
| 6,244,937 B1 | * | 6/2001 | Jaskowiak et al. ............. 451/51 |
| 6,379,217 B1 | | 4/2002 | Thyssen |

FOREIGN PATENT DOCUMENTS

JP        8-174379        7/1996

* cited by examiner

*Primary Examiner* — Timothy V Eley
(74) *Attorney, Agent, or Firm* — Oblon, Spivak, McClelland, Maier & Neustadt, L.L.P.

(57) ABSTRACT

An apparatus and method for grinding a workpiece by rotating the workpiece about a rotational axis, rotating a cylindrical grinding wheel about a rotational axis being parallel to the rotational axis of the workpiece, moving the grinding wheel relative to the workpiece at least in one of a first direction being perpendicular to the rotational axis of the workpiece for grinding the workpiece at a cylindrical surface of the grinding wheel and a second direction being parallel to the rotational axis of the workpiece for grinding the workpiece at an end surface of the grinding wheel being perpendicular to the rotational axis of the grinding wheel, and by superimposing a vibration signal including a plurality of frequency components to a driving signal outputted to one of a workpiece rotating means for rotating the workpiece and a grinding wheel rotating means for rotating the grinding wheel.

20 Claims, 5 Drawing Sheets

APPARATUS AND METHOD FOR GRINDING WORKPIECE

CROSS REFERENCE TO RELATED APPLICATIONS

This application is based on and claims priority under 35 U.S.C. §119 to Japanese Patent Application 2007-170470, filed on Jun. 28, 2007, the entire content of which is incorporated herein by reference.

FIELD OF THE INVENTION

The present invention generally relates to an apparatus and method for grinding a workpiece.

BACKGROUND

Conventionally, a workpiece is processed by a processing apparatus including a base, a workhead table, a grinding wheel table, and a numerical control apparatus, for example. With reference to FIG. 4A, a workpiece Wp is rotated about a workpiece rotational axis (hereinafter referred to as C-axis), and a cylindrical grinding wheel 300 is rotated about a grinding wheel rotational axis which is parallel to the C-axis, thus processing (grinding) the workpiece Wp. When grinding the workpiece Wp, as illustrated in FIG. 4B, the grinding wheel 300 is relatively moved to be close to the workpiece Wp along a direction being perpendicular to the C axis (workpiece rotational axis). A cylindrical surface We of the workpiece Wp is ground by a cylindrical surface 300E of the grinding wheel 300 accordingly. Herein, a workhead motor for rotating the workpiece Wp about the C axis (the workpiece rotational axis), a grinding wheel table driving motor for moving the grinding wheel 300 to be close to and away from the workpiece Wp in a direction being perpendicular to the C axis (hereinafter, the direction is referred to as X-axial direction), a grinding wheel driving motor for rotating the grinding wheel 300 about the grinding wheel rotational axis, and a workhead table driving motor for slidably moving the grinding wheel 300 relative to the workpiece Wp in a direction being parallel to the C axis (hereinafter, the direction is referred to as Z-axial direction), are driven by driving signals outputted from the numerical control apparatus (control means).

Herein, when processing (grinding) the workpiece Wp as illustrated in FIG. 4B by means of the known processing apparatus, regular spaced recesses and/or protrusions may be formed at a processed surface (cylindrical surface We) of the workpiece WP and a riblike mark Bm (so called chatter mark) is formed at the processed surface, as illustrated in FIG. 4C. When grinding the workpiece Wp by moving the grinding wheel 300, which rotates about the grinding wheel rotational axis, so as to contact the workpiece Wp while rotating the workpiece Wp about the workpiece rotational axis (C-axis), a deviation of a position of the grinding wheel 300 in the X-axial direction (i.e., a difference between a target position and an actual position) is periodically generated because of vibration due to an unbalance of the grinding wheel 30. Then, a distance (distance between central points) between a central point of the grinding wheel (grinding wheel rotational axis) and a central point of the workpiece (the workpiece rotational axis) in the X-axial direction is periodically changed. Then, a correlation between the rotational speed of the C-axis and a frequency, which is generated by a change of a distance between central points of the grinding wheel 300 and the workpiece Wp, is in an integral multiple proportion. Such process may cause the formation of the riblike mark Bm on the cylindrical surface We of the workpiece Wp. On occasions, the riblike mark Bm may be so small that only a person skilled in the art can recognize the riblike mark Bm. In a case where the workpiece Wp is assembled to a manufactured product, for example, without noticing that the riblike mark Bm is formed at the completely processed (ground) workpiece Wp, noise and/or vibration may be generated. Therefore, it is preferable that the riblike mark Bm is not formed even if it is so small so as not to be recognized by a naked eye. Further, as illustrated in FIG. 5, when grinding an end surface Wt of the workpiece Wp (i.e., a surface being perpendicular to the workpiece rotational axis) by means of an end surface 300T of the grinding wheel 300 (i.e., a surface being perpendicular to the grinding wheel rotational axis) by relatively moving the grinding wheel 300 in the Z-axial direction, the riblike mark BM may be formed at the end surface Wt of the workpiece Wp.

Therefore, JP1996-174379A (hereinafter referred to as reference 1) discloses a chattering vibration restraining method for repeating a process, where the vibration occurring when the workpiece is ground is monitored and the generation of chattering vibration is detected by means of a vibration detecting device (a vibration sensor) and a frequency analyzing device (an FFT analyzer) assembled to the processing apparatus, and further where driving conditions, such as the rotational speed of the grinding wheel and the rotational speed of the workpiece, are changed, until the chattering vibration is restrained.

According to the processing apparatus disclosed in the reference 1, the chattering vibration is detected at the workpiece Wp, the grinding wheel 300, and various driving conditions such as the rotational speed of the workpiece Wp (rotational speed of C-axis), the rotational speed of the grinding wheel 300, the feeding speed of the grinding wheel 300, and so on, by means of the frequency analyzer. Further, a driving condition where the chattering vibration is not generated should be assured. Thus, a large effort is required. Further, in a case where one of the rotational speed of the workpiece Wp (the rotational speed of the C-axis), the rotational speed of the grinding wheel and the feeding speed of the grinding wheel is changed when the chattering vibration is detected, the speed is normally changed to be slower, thus extending a cycle time and leading to a reduction of a processing efficiency. In addition, when one of the above described speeds is changed, the processing accuracy and/or a quality of the processed surface of the workpiece Wp may be affected. Still further, a three-phase motor, of which rotational speed is constant, may be employed as the driving motor for rotating the grinding wheel 300. In a case where such three-phase motor is used, the rotational speed of the grinding wheel 300 is not changed. In such a condition, in order to change the rotational speed of the grinding wheel, the driving motor is required to be replaced by a motor, such as an inverter motor, of which rotational speed is changeable, so that extra man-hour and cost is required to replace the driving motor.

A need thus exists for an apparatus and method for grinding a workpiece which are not susceptible to the drawback mentioned above.

SUMMARY OF THE INVENTION

According to a first aspect of the present invention, a method for grinding a workpiece includes processes of rotating the workpiece about a rotational axis, rotating a cylindrical grinding wheel about a rotational axis being parallel to the rotational axis of the workpiece, moving the grinding wheel relative to the workpiece at least in one of a first direction being perpendicular to the rotational axis of the workpiece for grinding the workpiece at a cylindrical surface of the grinding wheel and a second direction being parallel to the rotational axis of the workpiece for grinding the workpiece at an end surface of the grinding wheel being perpendicular to the rotational axis of the grinding wheel, and superimposing a vibration signal including a plurality of frequency components to a driving signal outputted to a workpiece rotating means for rotating the workpiece.

According to a second aspect of the present invention, a method for grinding a workpiece includes processes of rotating the workpiece about a rotational axis, rotating a cylindrical grinding wheel about a rotational axis being parallel to the rotational axis of the workpiece, moving the grinding wheel relative to the workpiece at least in one of a first direction being perpendicular to the rotational axis of the workpiece for grinding the workpiece at a cylindrical surface of the grinding wheel and a second direction being parallel to the rotational axis of the workpiece for grinding the workpiece at an end surface of the grinding wheel being perpendicular to the rotational axis of the grinding wheel, and superimposing a vibration signal including a plurality of frequency components to a driving signal outputted to a grinding wheel rotating means for rotating the grinding wheel.

According to a third aspect of the present invention, an apparatus for grinding a workpiece includes a workpiece rotating means for rotating the workpiece about a rotational axis, a grinding wheel rotating means for rotating a cylindrical grinding wheel about a rotational axis being parallel to the rotational axis of the workpiece, a grinding means including at least one of a first grinding means for moving the grinding wheel relative to the workpiece in a first direction being perpendicular to the rotational axis of the workpiece for grinding the workpiece at a cylindrical surface of the grinding wheel and a second grinding means for moving the grinding wheel relative to the workpiece in a second direction being parallel to the rotational axis of the workpiece for grinding the workpiece at an end surface of the grinding wheel being perpendicular to the rotational axis of the grinding wheel, and a controlling means for outputting a driving signal to each of the workpiece rotating means, the grinding wheel rotating means and the grinding means. The controlling means superimposes a vibration signal including a plurality of frequency components to the driving signal outputted to the workpiece rotating means. The workpiece rotating means rotates the workpiece while changing a circumferential speed of the workpiece at a random interval on the basis of the driving signal superimposed with the vibration signal and outputted from the controlling means.

According to a fourth aspect of the present invention, an apparatus for grinding a workpiece includes a workpiece rotating means for rotating the workpiece about a rotational axis, a grinding wheel rotating means for rotating a cylindrical grinding wheel about a rotational axis being parallel to the rotational axis of the workpiece, a grinding means including at least one of a first grinding means for moving the grinding wheel relative to the workpiece in a first direction being perpendicular to the rotational axis of the workpiece for grinding the workpiece at a cylindrical surface of the grinding wheel and a second grinding means for moving the grinding wheel relative to the workpiece in a second direction being parallel to the rotational axis of the workpiece for grinding the workpiece at an end surface of the grinding wheel being perpendicular to the rotational axis of the grinding wheel, and a controlling means for outputting a driving signal to each of the workpiece rotating means, the grinding wheel rotating means, and the grinding means. The controlling means superimposes a vibration signal including a plurality of frequency components to the driving signal outputted to the grinding wheel rotating means. The grinding wheel rotating means rotates the grinding wheel while changing a circumferential speed of the grinding wheel at a random interval on the basis of the driving signal superimposed with the vibration signal and outputted from the controlling means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
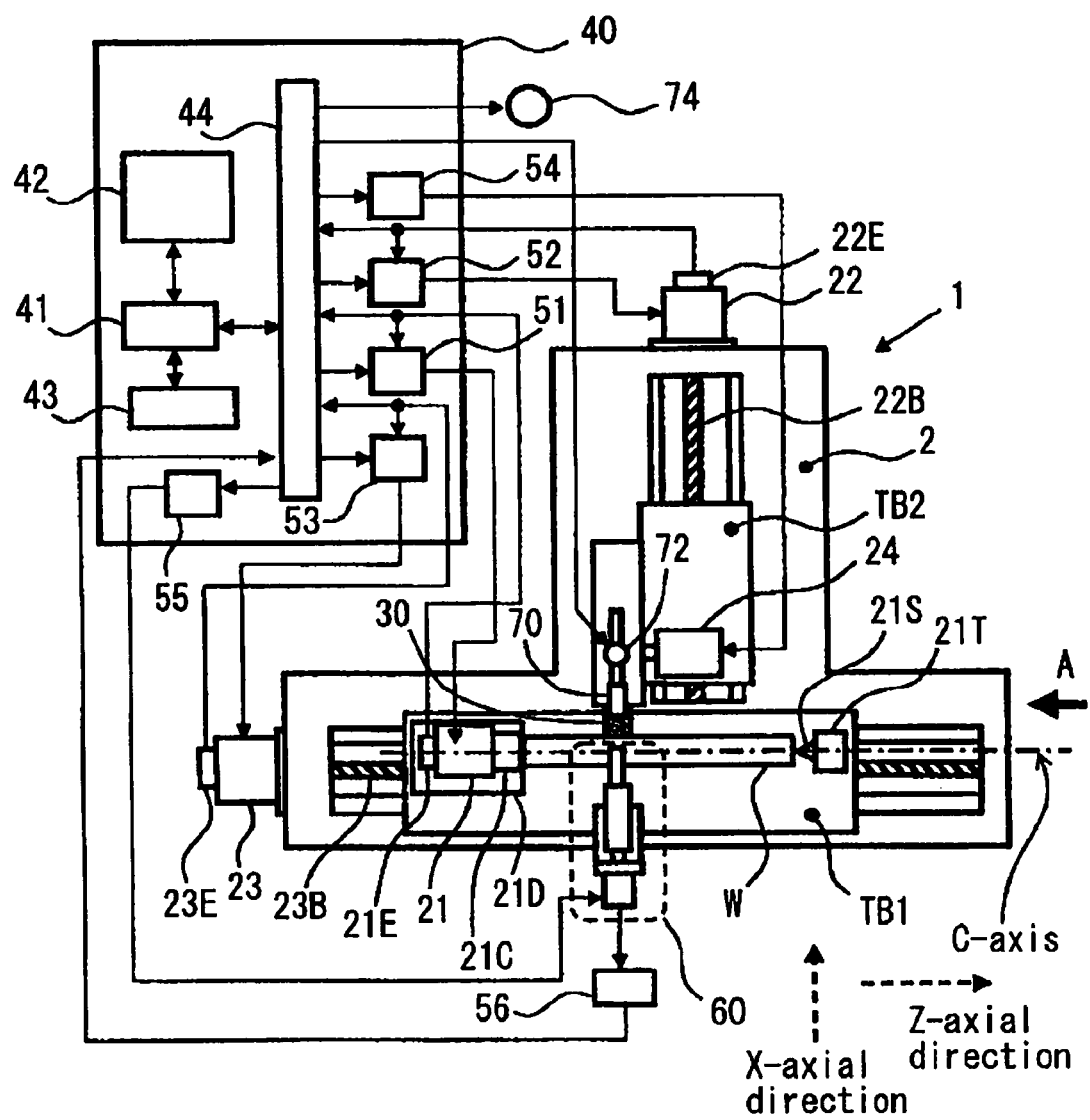
FIG. 1 is an explanatory view schematically illustrating a processing apparatus for a workpiece according to first and second embodiments.
Figure 2:
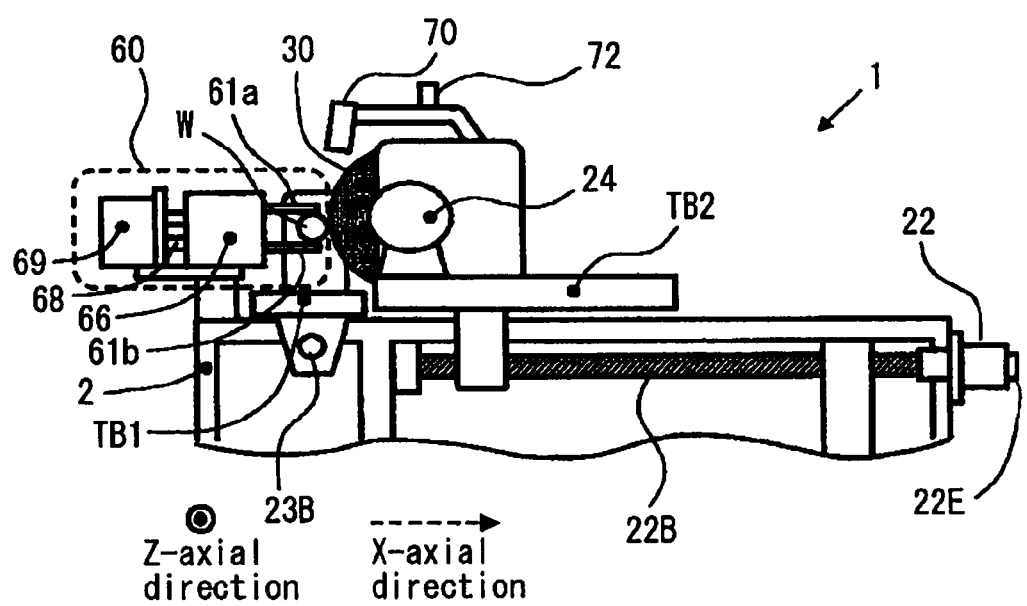
FIG. 2 is a side view illustrating the processing apparatus for the workpiece seen from a direction of an arrow A in FIG. 1.

An embodiment of the present invention will be described hereinafter with reference to attached drawings. FIG. 1 is a planar view illustrating a processing apparatus 1 (a grinder) applied with a method for grinding a workpiece, according to embodiments described hereinbelow. FIG. 2 is a side view illustrating the processing apparatus 1 seen from a direction of an arrow A in FIG. 1.

A structure of the processing apparatus 1 (serving as an apparatus for grinding a workpiece) will be described hereinafter with reference to FIGS. 1 and 2. The processing apparatus 1 includes a base 2, a workhead table TB1, a grinding wheel table TB2 and a numerical control apparatus 40 (not illustrated in FIG. 2). The numerical control apparatus 40 serves as a controlling means. The grinding wheel table TB2 includes a grinding wheel 30, which exhibits substantially a cylindrical shape. A grinding wheel driving motor 24, which is mounted on the grinding wheel table TB2, drives the grinding wheel 30 to rotate about a rotational axis being parallel to an axis Z. The grinding wheel driving motor 24 serves as a grinding wheel rotating device and also as a grinding wheel rotating means. The axis Z is arranged to be parallel with a centerline of an axis C, which is a rotational axis of a workpiece W (serving as a workpiece). Herein, a feed screw 23B, which will be described later, serves as the axis Z. A coolant nozzle 70 is employed for discharging (supplying) coolant (fluid such as cooling oil, for example) for cooling and lubricating a processed portion of the workpiece W and the grinding wheel 30. The coolant is supplied to the coolant nozzle 70 by a coolant supplying pump 74 and then is discharged by the coolant nozzle 70. The coolant supplying pump 74 is controlled by the numerical control apparatus 40. The amount of the coolant discharged from the coolant nozzle 70 is regulated by a flow regulating valve 72 which is controlled by the numerical control apparatus 40. A workhead motor 21 supports the workpiece W and drives the workpiece W to rotate about the axis C. The workhead motor 21 serves as a C axis driving device and also serves as a workpiece rotating means. Further, the grinding wheel table TB2 is allowed to move in a direction of an axis X (hereinafter referred to as X-axial direction) relative to the base 2 by means of a grinding wheel table driving motor 22, a feed screw 22B, which are provided at the base 2, and a nut (not illustrated), which is provided at the grinding wheel TB2. The grinding wheel table driving motor 22 serves as an X-axis driving device and also serves as a first grinding means. The axis X is arranged to be perpendicular to the centerline of the axis C (the rotational axis of the workpiece W). Herein, the feed screw 22B serves as the axis X. Further, the X-axial direction serves as a first direction being perpendicular to the rotational axis of the workpiece.

The workhead table TB1 is allowed to move in a direction of an axis Z (hereinafter referred to as Z-axial direction) relative to the base 2 by means of a workhead table driving motor 23 and the feed screw 23B, which are provided at the base 2, and a nut (not illustrated), which is provided at the workhead table TB1. The workhead table driving motor 23 serves as a Z-axis driving device and also serves as a second grinding means. The Z-axial direction serves as a second direction being parallel to the rotational axis of the workpiece W (the centerline of the axis C). A tailstock 21T is secured on the workhead table TB1. Further, a workhead unit 21D is mounted on the workhead table TB1 so as to face the tailstock 21T. Still further, the workhead unit 21D is allowed to move to be close to and away from the tailstock 21T, so that the processing apparatus 1 is applicable to any workpiece having any length. Supporting portions 21C and 21S (such as chucks, for example) are provided at the workhead unit 21D and the tailstock 21T, respectively. The workpiece W is retained (supported) between the supporting portions 21C and 21S. The axis C corresponds to an axis connecting central points of the supporting portions 21C and 21S.

The workpiece W rotates about the axis C connecting the supporting portions 21C and 21S by means of the workhead motor 21 provided at the workhead unit 21D. Further, a position detecting device 22E is provided at the grinding wheel table driving motor 22, and a position detecting device 23E is provided at the workhead table driving motor 23. The position detecting device 22E detects a position of the grinding wheel table TB2 in the X-axial direction. The position detecting device 23E detects a position of the workhead table TB1 in the Z-axial direction. Still further, a position detecting device 21E is provided at the workhead motor 21. The position detecting device 21E detects a rotational angle and a rotational speed of the workpiece W. According to the embodiment, encoders are employed as the position detecting devices 21E, 22E and 23E.

The numerical control apparatus 40 is structured by a CPU 41, a memory device 42, an input-output device 43 (such as a keyboard and a monitor, for example), an interface 44 and driving units 51, 52, 53, 54 and 55. The numerical control apparatus 40 controls the workhead motor 21, the grinding wheel table driving motor 22, the workhead table driving motor 23 and the grinding wheel driving motor 24 on the basis of, for example, processing data and a processing program which are memorized in the memory device 42. The CPU 41 calculates an output command value on the basis of data inputted from the input-output device 43, the program and the data memorized in the memory device 42, and external input signals inputted to the CPU via the interface 44. Then, the CPU 41 outputs the output command value via the interface 44. As the external input signal, a signal outputted from the position detecting device 21E for detecting the rotational angle (or the rotational speed) of the workpiece W, a signal outputted from the position detecting device 22E for detecting the position of the grinding wheel table TB2 in the X-axial direction, a signal outputted from the position detecting device 23E for detecting the position of the workhead table TB1 in the Z-axial direction, and a signal from a sizing device 60 for measuring an outer diameter of the workpiece W are employed, for example.

The output command value is a control value for controlling the rotational angle (or the rotational speed) of the workpiece W, the position of the grinding wheel table TB2 in the X-axial direction, the position of the workhead table TB1 in the Z-axial direction and the rotational speed of the grinding wheel driving motor 24, for processing (grinding) the workpiece W. The output command value is outputted to the driving units 51 to 55 via the interface 44. The driving unit 51 of the numerical control apparatus 40 outputs a first driving signal to the workhead motor 21 so as to rotate the workpiece W about the axis C as a rotational center (the first driving signal serves as a driving signal outputted to a workpiece rotating means). The driving unit 52 outputs a second driving signal to the grinding wheel table driving motor 22 so as to move the grinding wheel table TB2 in the X-axial direction. The driving unit 53 outputs a third driving signal to the workhead table driving motor 23 so as to move the workhead table TB1 in the Z-axial direction. The driving unit 54 outputs a fourth driving signal to the grinding wheel driving motor 24 so as to rotate the grinding wheel 30 (the fourth driving signal serves as a driving signal outputted to a grinding wheel rotating means). The driving unit 55 outputs a fifth driving signal to the sizing device 60 so as to move the sizing device 60 in the X-axial direction and to move first and second arms 61a and 61b (see FIG. 2) to be close to and away from each other.

The driving units 51, 52, 53 load detecting signals outputted from the position detecting devices 21E, 22E, 23E, respectively, and then, perform feedback control so as to correct a difference between the output command value from the CPU 41 and the corresponding detecting signals. Thus, the driving units 51, 52 and 53 control the workhead motor 21, the grinding wheel table driving motor 22, and the workhead table driving motor 23, respectively. According to the embodiment illustrated in FIG. 1, the grinding wheel driving motor 24 is not provided with any detecting device. However, for example, a rotational speed detecting device may be provided at the grinding wheel driving motor 24 so as to perform a feedback control for controlling the rotational speed of the grinding wheel driving motor 24.

Next, a structure of the sizing device 60 will be described hereinafter with reference to FIG. 2, which is the side view of the processing apparatus 1. As is illustrated therein, the sizing device 60 (serving as the measuring means) is provided on the base 2 at an opposite position of the grinding wheel 30 relative to the workpiece W. The sizing device 60 measures an outer diameter of the workpiece W. More specifically, the sizing device 60 real-timely detects a size of the outer diameter of a processed portion while the workpiece W is rotated about the axis C so as to be ground and outputs a detection signal. Then, the numerical control apparatus 40 loads the detection signal from the sizing device 60 via an amplifier 56 (see FIG. 1) and real-timely and constantly recognizes the size of the outer diameter of the processed portion of the workpiece W. The sizing device 60 is structured with a driving device 69, a body portion 66, and so on. The driving device 69 drives the body portion 66 to move in the X-axial direction (i.e., in right and left directions in FIG. 2) via a pilot bar 68. First and second pivot arms 61a and 61b are pivotably provided at upper and lower end portions of the body portion 66, respectively. The first and second pivot arms 61a and 61b respectively include first and second feelers (not illustrated), which are employed as contactors for respectively making contact with upper and lower portions of the processed portion of the workpiece W and each of which serves as a detecting portion. Further, the first and second pivot arms 61a and 61b are biased in a direction to approach each other (i.e., in a direction where space between the first and second pivot arms 61a and 61b is reduced).

When not measuring the outer diameter of the processed portion of the workpiece W, the sizing device 60 is retained at a position where a space between the sizing device 60 and the workpiece W is the largest, and the first and second pivot arms 61a and 61b are retained in an opened state by means of a retracting device (not illustrated). On the other hand, when measuring the outer diameter of the processed portion of the workpiece W, the numerical control apparatus 40 sends a command to the driving device 69 via the driving unit 55 (see FIG. 1) so as to move the body portion 66 of the sizing device 60 in a direction to approach the work W along the X-axial direction while the workpiece is being ground, for example. Therefore, the driving device 69 drives the body portion 66 of the sizing device 60 in the X-axial direction so as to approach the workpiece W. Then, when the first and second feelers of the first and second pivot arms 61a and 61b reach the corresponding upper and lower portions of the processed portion of the workpiece W for measuring the outer diameter of the workpiece W, movement of the body portion 66 of the sizing device 60 is stopped. Next, when the numerical control apparatus 40 outputs a releasing command to the retract device via the driving unit 55 (see FIG. 1), the fillers of the first and second pivot arms 61a and 61b make contact with upper and lower portions of the outer periphery of the workpiece W, respectively. Thus, the processing apparatus 1 grinds the workpiece W by moving the grinding wheel 30 in a direction to be in contact with the workpiece W so as to grind the same while maintaining the fillers of the first and second pivot arms 61a, 61b in contact with the outer peripheral portion of the workpiece W. Accordingly, the outer diameter of the processed portion of the workpiece W is measured by the sizing device 60 while the grinding wheel 30 grinds the processed portion of the workpiece W.

Figure 3A:
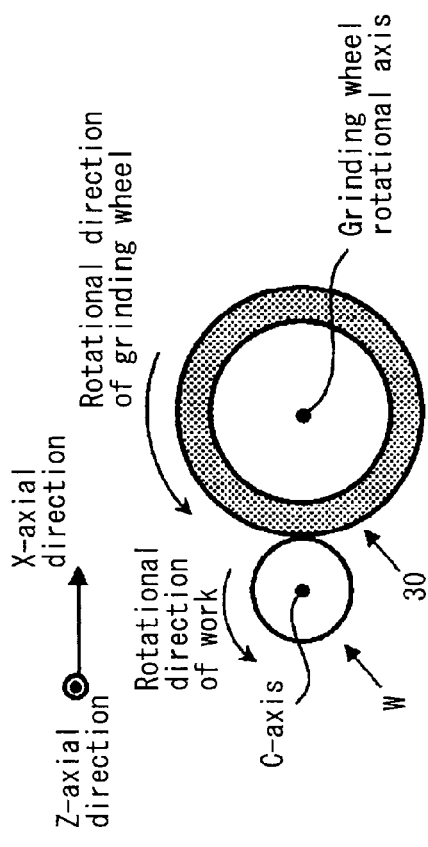
FIG. 3A is an explanatory view illustrating a grinding wheel and the workpiece in a ground state; according to the first and second embodiments.

Hereinafter, a method for grinding the workpiece W according to a first embodiment will be described with reference to FIGS. 3A and 3B. FIG. 3A is a schematic view illustrating the grinding wheel 30 and the workpiece W in a ground state. In the first embodiment, a rotational speed (rotational frequency) of the workpiece W is changed at a random and short interval when grinding a cylindrical surface WE of the workpiece W, thus changing a circumferential speed (mm/min) of the work piece W at a random and short interval. A method for changing the circumferential speed (mm/min) of the workpiece W at the random and short intervals will be described hereinbelow with reference to FIG. 3B. Herein, a radius of the processed portion of the workpiece W is assigned as "r" (mm), the circular constant is assigned as "π", and the rotational frequency (rotational speed) of the workpiece W per minute is assigned as "N". Then, the circumferential speed (mm/min) of the workpiece W will be obtained as below:

Circumferential speed of workpiece
$W$ (mm/min)=$2\pi r \times N$

Figure 3B:
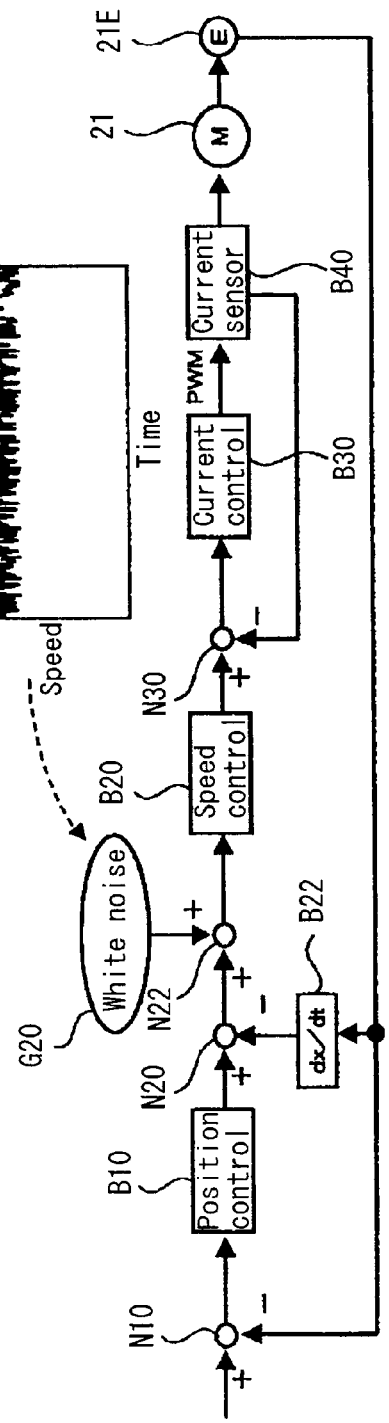
FIG. 3B is an explanatory view schematically illustrating a method for superimposing white noise to a driving signal of the workpiece, according to the first embodiment.

FIG. 3B illustrates an example of a controlling block of the driving unit 51 of the numerical control apparatus 40 illustrated in FIG. 1. Herein, the controlling block includes the workhead motor 21 and the position detecting device 21E. First, a target position (herein, corresponding to a target rotational angle of the axis C) corresponding to the output command value calculated in the CPU 41 is summatively inputted to a node N10. Further, an actual position (herein, corresponding to an actual rotational angle) determined on the basis of a detection signal from the position detecting device 21E is subtractively inputted to the node N10. Thus, a deviation between the target position and the actual position (deviation regarding positions) is obtained. Next, the obtained deviation (the deviation regarding the positions) is outputted from the node N10 and inputted to a position controlling block B10. Then, a rotational speed determined on the basis of the deviation inputted to the position controlling block B10 is outputted therefrom to a node N20. The rotational speed from the position controlling block B10 is summatively inputted to the node N20 and further, a rotational speed (time derivative value dx/dt of positions determined on the basis of the detection signal from the position detecting device 21E) outputted from a derivation block B22 is subtractively inputted to the node N20. Thus, a deviation (derivation regarding rotational speed) between the actual rotational speed and the rotational speed determined on the basis of the deviation regarding positions is obtained. The obtained deviation (the deviation regarding the rotational speed) is outputted from the node N20 to a node N22.

Figure 4A:
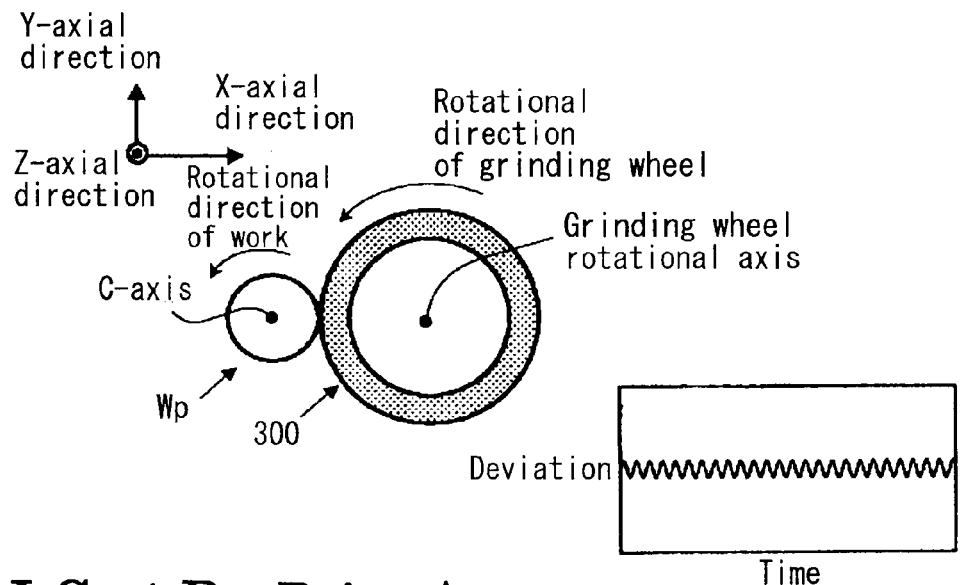
FIG. 4A is an explanatory view schematically illustrating a grinding wheel and a workpiece in a ground state and a generation of chattering vibration, according to a conventional grinding method.
Figure 4B:
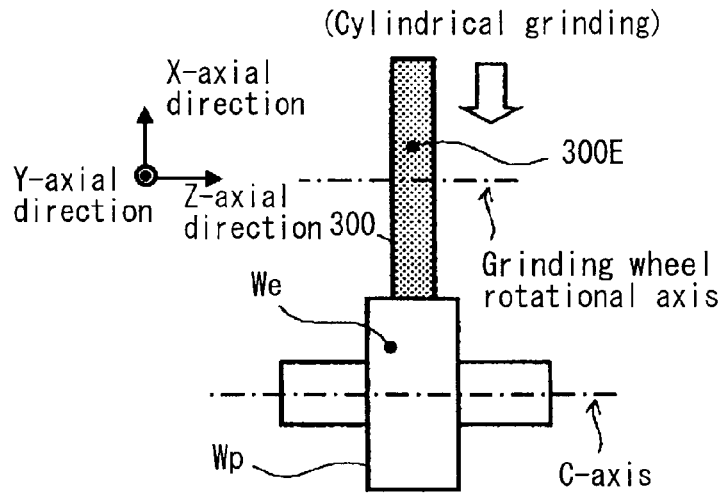
FIG. 4B is an explanatory view schematically illustrating a manner for grinding the workpiece at a cylindrical surface of the grinding wheel, according to the conventional grinding method.
Figure 4C:
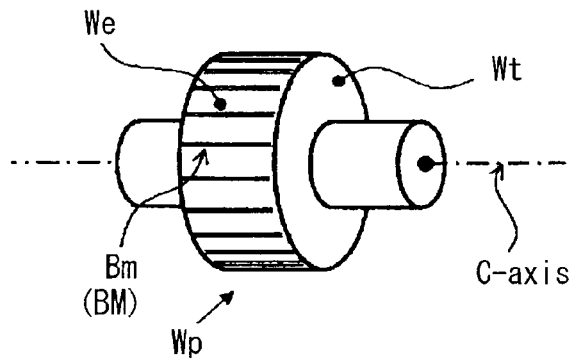
FIG. 4C is an explanatory view schematically illustrating a formation of chatter mark at a processed surface of the workpiece, according to the conventional grinding method.
Figure 5:
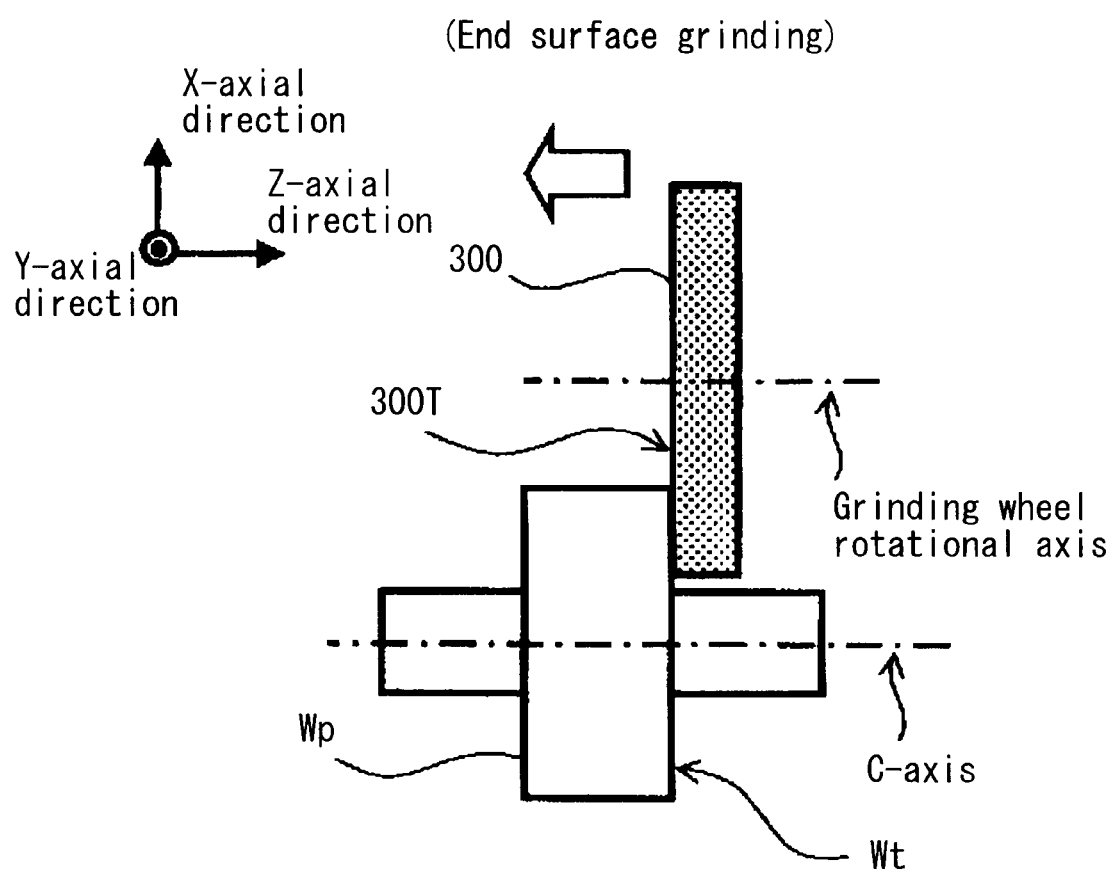
FIG. 5 is an explanatory view schematically illustrating a manner for grinding the workpiece at an end surface of the grinding wheel, according to the conventional grinding method.

The deviation from the node N20 (the deviation regarding the rotational speed) is summatively inputted to the node N22. Further, a white noise G20 outputted from the numerical control apparatus 40 is summatively inputted to the node N22 and is superimposed to the deviation inputted from the node N20 (the deviation regarding the rotational speed). Then, the deviation regarding the rotational speed and the superimposed white noise G20 are outputted from the node N22 and then inputted to a speed controlling block B20. The volume of each frequency component included in the white noise G20 is substantially the same. Further, as illustrated in FIG. 3B, the white noise G20 is outputted as speed at a predetermined vibration amplitude including the various frequency components each based on zero speed (for example, the various frequency components include 0 to 300 Hz) and is summatively inputted (superimposed) to the deviation regarding the rotational speed. Further, the predetermined vibration amplitude is defined, for example, to be 30 to 40 percent of a height of recesses and/or protrusions of riblike mark (chatter mark) BM (see FIG. 4C), which is formed at the workpiece W when the chattering vibration is generated. Still further, the white noise G20 with the predetermined vibration amplitude including the various frequency components is generated comparatively easily at the numerical control apparatus 40. Then, an electric current is obtained at the speed controlling block B20 on the basis of the rotational speed inputted from the node N20. The obtained electric current is outputted to a node N30.

The electric current outputted from the speed controlling block B20 is summatively inputted to the node N30. Further, an electric current obtained on the basis of a detection signal from an electric current sensor B40 (serving as an electric current detecting means for detecting actual electric current supplied to the workhead motor 21) is subtractively inputted to the node N30. Thus, a deviation of the electric current is obtained. The obtained deviation (deviation regarding the electric current) is outputted from the node N30 and then inputted to an electric current controlling block B30. Then, a driving signal is obtained at the electric current controlling block B30 on the basis of the inputted deviation regarding the electric current. Herein, a frequency, or duty ratio, of a PWM signal may be assigned as the driving signal, for example. The obtained driving signal is outputted to a motor M. Herein, the workhead motor 21 is assigned as the motor M, and the obtained driving signal corresponds to the first driving signal outputted from the driving unit 51. Then, the electric current sensor B40 detects an electric current actually supplied to the motor M by the driving signal outputted from the controlling block B30, and a detection signal is outputted to the node N30 from the electric current sensor B40. Then, a detection signal obtained on the basis of the actual rotational speed of the motor M is outputted from the position detecting device 21E to the derivation block B22 and to the node N10. Herein, a pulse string, of which period is based on the rotational speed, is assigned as the detection signal, for example.

As described above, by performing a grinding method for the workpiece W where the white noise including the plural frequency components is superimposed to the driving signal to the workhead motor 21 (motor M) by the numerical control apparatus 40, the circumferential speed of the workpiece W driven by the workhead motor 21 is changed at the random and short interval (by applying micro-vibration in a rotational direction of the workpiece W). Thus, the rotational frequency of the axis C (the rotational axis of the workpiece W) and a frequency generated by a change of a distance between rotational centers of the grinding wheel 30 and the workpiece W in the X-axial direction are not in an integral multiple proportional relationship. Accordingly, the chattering vibration is not necessarily measured at every condition of workpiece W, the grinding wheel 30 and processing condition (driving condition), thus comparatively readily restraining the generation of the chattering vibration of the grinding wheel 30. Further, the frequency components and the vibration amplitude of the white noise G20 which is superimposed to the driving signal outputted to the motor M is appropriately defined. Therefore, the chattering vibration is restrained from being generated without affecting the processing efficiency and the processing accuracy. Still further, the rotational speed of the grinding wheel 30 is not necessarily changed. Therefore, even when a three-phase motor of which rotational speed is constant is employed as the driving motor, the three-phase motor may not necessarily be replaced by an inverter motor of which rotational speed is changeable.

Additionally, when grinding the end surface WT of the workpiece W, the grinding method where the white noise including the plural frequency components is superimposed to the driving signal to the workhead motor 21 at the numerical control apparatus 40 may be performed in the same manner as described above. Thus, the rotational frequency of the axis C (the rotational axis of the workpiece W) and a frequency generated by a change of a distance between the grinding wheel 30 and the workpiece W in the Z-axial direction are not in an integral multiple proportional relationship.

A second embodiment of the present invention will be described hereinafter. According to the second embodiment, a circumferential speed (the rotational speed) of the grinding wheel 30 is changed at a random and short interval when grinding the cylindrical surface WE of the workpiece W, which is different from the first embodiment in which the circumferential speed (rotational speed) of the workpiece W is changed at the random and short interval. According to the second embodiment, a speed detection apparatus is provided at the grinding wheel driving motor 24 illustrated in FIG. 1. Further the grinding wheel driving motor 24 is assigned as the motor M illustrated in FIG. 3B. Thus, in the controlling block according to the second embodiment, the position detecting device 21E according to the first embodiment is replaced by the speed detection apparatus of the grinding wheel driving motor 24. Further, a motor of which rotational speed is changeable is employed as the grinding wheel driving motor 24. Input signals and output signals of each node (the node N10, N20, N22, N30), each controlling block (position controlling block B10, the speed controlling block B30 and the electric current controlling block B30), and the electric current sensor B40 are the same as those in the first embodiment, so that the description will be omitted herein. Herein, a radius of the grinding wheel 30 is assigned to be "R" (mm), the circular constant is assigned to be "$\pi$", and a rotational frequency (rotational speed) of the grinding wheel 30 per minute is assigned to be "M". Then, the circumferential speed (mm/min) of the grinding wheel 30 will be obtained as below.

Circumferential speed of the grinding wheel 30 (mm/min)=$2\pi R \times M$

Herein, according to the second embodiment, the grinding wheel driving motor 24 is assigned as the motor M, and the driving signal which is obtained in the same manner as the first embodiment corresponds to the fourth driving signal outputted from the driving unit 54 of the numerical control apparatus.

As described above, by performing a grinding method for the workpiece W where the white noise including the plural frequency components is superimposed to the driving signal to the grinding wheel driving motor 24 (motor M) at the numerical control apparatus 40, the circumferential speed of the grinding wheel 30 driven by the grinding wheel driving motor 24 is changed at the random and short interval (by applying micro vibration in a rotational direction of the grinding wheel 30). Thus, in the same manner as the first embodiment, the rotational frequency of the rotational axis of the grinding wheel 30 and a frequency generated by a change of a distance between rotational centers of the grinding wheel 30 and the workpiece W in the X-axial direction are not in an integral multiple proportional relationship. Accordingly, further in the same manner as the first embodiment, the chattering vibration is not necessarily measured at every condition of workpiece W, the grinding wheel 30 and processing condition (driving condition), thus comparatively readily restraining the generation of the chattering vibration of the grinding wheel 30. More specifically, the rotational speed of the grinding wheel 30 is changed directly at the short interval, thus leading to a restraint of the chattering vibration from being generated in accordance with the resonance of the grinding wheel 30. Further, in the same manner as the first embodiment, the frequency components and vibration amplitude of the white noise being superimposed to the driving signal outputted to the motor M is appropriately defined. Therefore, the chattering vibration is restrained from being generated without affecting the processing efficiency and the processing accuracy.

Additionally, when grinding the end surface WT of the workpiece W, the grinding method where white noise including the plural frequency components is superimposed to the driving signal to the grinding wheel driving motor 24 at the numerical control apparatus 40 may be performed in the same manner as described above. Thus, the rotational frequency of the rotational axis of the grinding wheel 30 and a frequency generated by a change of a distance between the grinding wheel 30 and the workpiece W in the Z-axial direction are not in an integral multiple proportional relationship.

According to the above described embodiments, the grinding wheel 30 is moved in the X-axial direction relative to the workpiece W by the grinding wheel table driving motor 22 of the processing apparatus 1 as illustrated in FIG. 1. Alternatively, the processing apparatus 1 is structured so that the workpiece W is moved in the X-axial direction relative to the grinding wheel 30. Accordingly, the X-axis driving device for moving the workpiece W relative to the grinding wheel 30 in the X-axial direction corresponds to the first grinding means for moving the grinding wheel 30 relative to the workpiece in the first direction for grinding the workpiece W at the cylindrical surface of the grinding wheel 30. Further, as described above, the workpiece W is moved in the Z-axial direction relative to the grinding wheel 30 by the workhead table driving motor 23 of the processing apparatus 1 as illustrated in FIG. 1. Alternatively, the processing apparatus 1 may be structured so that the grinding wheel 30 is moved in the Z-axial direction relative to the workpiece W. Accordingly the Z-axis driving device brings the grinding wheel 30 to move relative to the workpiece W in the Z-axial direction. Thus, the Z-axis driving device serves as the second grinding means for moving the grinding wheel 30 in the second direction for grinding the workpiece at an end surface of the grinding wheel 30. Still further, according to the above described embodiments, the white noise is superimposed to the driving signal for the workhead motor 21 driving the workpiece W to rotate, or to the driving signal for the grinding wheel driving motor 24 driving the grinding wheel 30 to rotate. However, a signal superimposed to such driving signals for a motor is not limited to be the white noise. Alternatively, any vibration signal including plural frequency components may be employed as such signal superimposed to the driving signal outputted to the motor.

Further, according to the above described embodiments, the white noise G20 (serving as the vibration signal) is superimposed (summatively inputted) to a speed command signal, which is summatively inputted to the node N22 of the controlling block illustrated in FIG. 3, as the speed (at the predetermined vibration amplitude including the various frequency components). Alternatively, the white noise G20 may be superimposed to other driving signals for speed command signal, such as the position command signal summatively inputted to the node N10, the electric current signal summatively inputted to the node N30, or the like.

Without being limited by an appearance, a structure, a processing manner, a moving manner, and so on, of the processing apparatus 1, variations and changes (such as addition and deletion) may be made for the apparatus (processing apparatus 1) and method for grinding the workpiece without departing from the spirit of the present invention. Further, numerical values are not limited to the numerical values employed in the above described embodiments, which are used as examples. Still further, when the white noise including the various frequency components are superimposed to the driving signal outputted to the motor, the processing apparatus 1 may react to any conditions such as the condition of the workpiece W, the condition of the grinding wheel 30, and the driving condition, for example. Accordingly, man-hours for adjusting the processing apparatus by such conditions may be reduced. Still further, according to the first and second embodiments, the processing apparatus 1 includes the first grinding means (grinding wheel table driving motor 22), which moves the grinding wheel 30 so as to grind the workpiece W from the direction being perpendicular to the rotational axis of the workpiece W (the first direction, i.e., the X-axial direction), and the second grinding means (the workhead table driving motor 23), which moves the workhead table TB1 so as to grind the workpiece W from the direction being parallel with the rotational axis of the workpiece W (the second direction, i.e., the Z-axial direction). Alternatively, the processing apparatus 1 may include at least one of the first grinding means and the second grinding means.

Due to the above described method and structure, the vibration signal including the plurality of frequency components is superimposed to the driving signal outputted to the workhead motor 21, thus changing the circumferential speed of the workpiece W driven by the workhead motor 21 at the random and short interval by applying the micro-vibration in the rotational direction of the workpiece W. Accordingly, the rotational frequency of the axis C (the rotational axis of the workpiece W) and the frequency generated by the change of the distance between the grinding wheel 30 and the workpiece W in the X-axial direction and/or the Z-axial direction are not in the integral multiple proportional relationship. So configured, the method and structure (of the processing apparatus 1) for grinding the workpiece W described above are different from a method and apparatus for grinding a workpiece, in which a change of a position of a grinding wheel (a periodical change of a distance between the workpiece and the grinding wheel in the X-axial direction and the Z-axial direction) is generated periodically. Thus, recesses and/or protrusions due to an unbalance of the grinding wheel are restrained from being formed at a surface of the workpiece W, thereby leading to a restraint of a formation of the chatter mark BM. The vibration signal including the plurality of frequency components is comparatively easily generated by the numerical control apparatus 40. Further, because the circumferential speed of the grinding wheel is changed at the random and short intervals, the chattering vibration (resonance) of the grinding wheel 30, which will be periodically generated, may be directly restrained. Accordingly, the chattering vibration is not necessarily measured at every condition of the workpiece W, the grinding wheel 30 and the processing condition (driving condition), and the driving condition is not necessarily changed at such conditions. Still further, the frequency components and the vibration amplitude of the white noise G20 which is superimposed to the driving signal outputted to the workhead motor 21 is appropriately defined. Therefore, the chattering vibration is restrained from being generated without affecting the processing efficiency and the processing accuracy of the workpiece W. In addition, the rotational speed of the grinding wheel 30 is not necessarily changed. Therefore, even when a three-phase motor of which rotational speed is constant is employed as the grinding wheel driving motor 24, the three-phase motor may not necessarily be replaced by an inverter motor of which rotational speed is changeable.

Further due to the above described method and structure, the vibration signal including the plurality of frequency components is superimposed to the driving signal outputted to the grinding wheel driving motor 24, thus changing the circumferential speed of the grinding wheel 30 at the random and short interval by applying the micro-vibration in the rotational direction of the grinding wheel 30. Accordingly, the rotational frequency of the rotational axis of the grinding wheel 30 and the frequency generated by the change of the distance between the grinding wheel 30 and the workpiece W in the X-axial direction and/or the Z-axial direction are not in the integral multiple proportional relationship. Thus, recesses and/or protrusions due to the unbalance of the grinding wheel are restrained from being formed at the surface of the workpiece W, thereby leading to a restraint of a formation of the chatter mark BM. In the same manner as described above, the vibration signal including the plurality of frequency components is comparatively easily generated by the numerical control apparatus 40. Further, the chattering vibration is not necessarily measured at every condition of workpiece W, the grinding wheel 30 and the processing condition (driving condition), and the driving condition is not necessarily changed at such conditions. Still further, the frequency components and the vibration amplitude of the white noise G20 which is superimposed to the driving signal outputted to the grinding wheel driving motor 24 is appropriately defined. Therefore, the chattering vibration is restrained from being generated without affecting the processing efficiency and the processing accuracy. In addition, because the circumferential speed of the grinding wheel 30 is changed at the random and short intervals, chattering vibration (resonance) of the grinding wheel 30, which will be periodically generated, may be directly restrained.

Still further due to the above described method and structure, the white noise G20 is employed as the vibration signal including the plurality of frequency components. Because the white noise G20 includes the various frequency components, the above described method and structure are applicable to any workpiece with any length.

Still further due to the above described method and structure, the vibration signal is superimposed to the speed command signal. Therefore, the circumferential speed (the rotational speed) of the workpiece W and/or the grinding wheel 30 is appropriately changed at the short interval.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for grinding a workpiece, comprising:
rotating a cylindrical grinding wheel about a rotational axis being parallel to the rotational axis of the workpiece;
moving the grinding wheel relative to the workpiece at least in one of a first direction being perpendicular to the rotational axis of the workpiece for grinding the workpiece at a cylindrical surface of the grinding wheel and a second direction being parallel to the rotational axis of the workpiece for grinding the workpiece at an end surface of the grinding wheel being perpendicular to the rotational axis of the grinding wheel;
superimposing a vibration signal, including a plurality of frequency components, onto a driving signal outputted to a workpiece rotating means for rotating the workpiece; and
rotating the workpiece about a rotational axis, while changing a circumferential speed of the workpiece at random intervals, on the basis of the driving signal superimposed onto the vibration signal.

2. A method for grinding a workpiece according to claim 1, wherein the vibration signal including the plurality of frequency components includes a white noise.

3. A method for grinding a workpiece according to claim 2, wherein the driving signal to which the vibration signal is superimposed includes a speed command signal.

4. A method for grinding a workpiece according to claim 1, wherein the driving signal to which the vibration signal is superimposed includes a speed command signal.

5. A method for grinding a workpiece, comprising:
rotating a cylindrical grinding wheel about a rotational axis being parallel to the rotational axis of the workpiece;
moving the grinding wheel relative to the workpiece at least in one of a first direction being perpendicular to the rotational axis of the workpiece for grinding the workpiece at a cylindrical surface of the grinding wheel and a second direction being parallel to the rotational axis of the workpiece for grinding the workpiece at an end surface of the grinding wheel being perpendicular to the rotational axis of the grinding wheel;
superimposing a vibration signal, including a plurality of frequency components, onto a driving signal outputted to a grinding wheel rotating means for rotating the grinding wheel; and
rotating the workpiece about a rotational axis, while changing a circumferential speed of the workpiece at random intervals, on the basis of the driving signal superimposed onto the vibration signal.

6. A method for grinding a workpiece according to claim 5, wherein the vibration signal including the plurality of frequency components includes a white noise.

7. A method for grinding a workpiece according to claim 6, wherein the driving signal to which the vibration signal is superimposed includes a speed command signal.

8. A method for grinding a workpiece according to claim 5, wherein the driving signal to which the vibration signal is superimposed includes a speed command signal.

9. An apparatus for grinding a workpiece, comprising:
a workpiece rotating means for rotating the workpiece about a rotational axis;
a grinding wheel rotating means for rotating a cylindrical grinding wheel about a rotational axis being parallel to the rotational axis of the workpiece;
a grinding means including at least one of a first grinding means for moving the grinding wheel relative to the workpiece in a first direction being perpendicular to the rotational axis of the workpiece for grinding the workpiece at a cylindrical surface of the grinding wheel and a second grinding means for moving the grinding wheel relative to the workpiece in a second direction being parallel to the rotational axis of the workpiece for grinding the workpiece at an end surface of the grinding wheel being perpendicular to the rotational axis of the grinding wheel; and
a controlling means for outputting a driving signal to each of the workpiece rotating means, the grinding wheel rotating means and the grinding means,
wherein the controlling means superimposes a vibration signal including a plurality of frequency components, onto the driving signal outputted to the workpiece rotating means,
and the workpiece rotating means rotates the workpiece, while changing a circumferential speed of the workpiece at random intervals, on the basis of the driving signal superimposed onto the vibration signal and outputted from the controlling means.

10. An apparatus for grinding a workpiece according to claim 9, wherein
the workpiece rotating means rotates the workpiece while changing the circumferential speed of the workpiece at the random interval by applying micro-vibration to the workpiece in a rotational direction thereof.

11. An apparatus for grinding a workpiece according to claim 10,
wherein the driving signal to which the vibration signal is interposed includes a speed command signal.

12. An apparatus for grinding a workpiece according to claim 9,
wherein the vibration signal including the plurality of frequency components includes a white noise.

13. An apparatus for grinding a workpiece according to claim 12, wherein the driving signal to which the vibration signal is interposed includes a speed command signal.

14. An apparatus for grinding a workpiece according to claim 9,
wherein the driving signal to which the vibration signal is interposed includes a speed command signal.

15. An apparatus for grinding a workpiece, comprising:
a workpiece rotating means for rotating the workpiece about a rotational axis;
a grinding wheel rotating means for rotating a cylindrical grinding wheel about a rotational axis being parallel to the rotational axis of the workpiece;
a grinding means including at least one of a first grinding means for moving the grinding wheel relative to the workpiece in a first direction being perpendicular to the rotational axis of the workpiece for grinding the workpiece at a cylindrical surface of the grinding wheel and a second grinding means for moving the grinding wheel relative to the workpiece in a second direction being parallel to the rotational axis of the workpiece for grinding the workpiece at an end surface of the grinding wheel being perpendicular to the rotational axis of the grinding wheel; and
a controlling means for outputting a driving signal to each of the workpiece rotating means, the grinding wheel rotating means, and the grinding means,
wherein the controlling means superimposes a vibration signal, including a plurality of frequency components, onto the driving signal outputted to the grinding wheel rotating means,
and the grinding wheel rotating means rotates the grinding wheel, while changing a circumferential speed of the grinding wheel at random intervals, on the basis of the driving signal superimposed onto the vibration signal and outputted from the controlling means.

16. An apparatus for grinding a workpiece according to claim 15, wherein
the grinding wheel rotating means rotates the grinding wheel while changing the circumferential speed of the grinding wheel at the random interval by applying micro-vibration to the grinding wheel in a rotational direction thereof.

17. An apparatus for grinding a workpiece according to claim 16,
wherein the driving signal to which the vibration signal is interposed includes a speed command signal.

18. An apparatus for grinding a workpiece according to claim 15,
wherein the vibration signal including the plurality of frequency components includes a white noise.

19. An apparatus for grinding a workpiece according to claim 18,
wherein the driving signal to which the vibration signal is interposed includes a speed command signal.

20. An apparatus for grinding a workpiece according to claim 15,
wherein the driving signal to which the vibration signal is interposed includes a speed command signal.

* * * * *